Aug. 24, 1926.

W. D. MERCER

COMPRESSOR DRIVE

Filed August 15, 1925    2 Sheets-Sheet 2

1,597,326

William D. Mercer
Inventor
Attorneys

Patented Aug. 24, 1926.

1,597,326

UNITED STATES PATENT OFFICE.

WILLIAM D. MERCER, OF DETROIT, MICHIGAN, ASSIGNOR TO KELVINATOR CORPORATION, OF DETROIT, MICHIGAN, A CORPORATION OF MICHIGAN.

COMPRESSOR DRIVE.

Application filed August 15, 1925. Serial No. 50,409.

The adaptation of mechanical refrigerating systems to small units suitable for installation in stores and houses has necessitated introducing into the systems heretofore used a large number of improvements particularly designed for the particular purpose. At the present time substantially all of these installations are operated by means of electric motors and so far as I am aware in substantially all of these motor operated installations the motor is connected to the compressor by means of a belt and the installation subjected to the obvious disadvantages of a belt drive. The majority of these installations employ a low starting torque motor such as the common split phase motor and this belt drive is employed, in spite of its disadvantages, to afford the motor an opportunity to quickly reach running speed through slippage of the belt and in addition to permit the motor to run independently of the compressor when the compressor operating resisting torque reaches an abnormal value. My invention provides a refrigerating system having a compressor drive which avoids the objections of the belt drive and at the same time permits the use of a low starting torque motor. In the drawings accompanying this specification and forming a part thereof I have shown, for purposes of illustration, one physical embodiment which my invention may assume. In these drawings:

Figure 3 is a section on the line 3—3 of Figure 2, while

Figure 1:
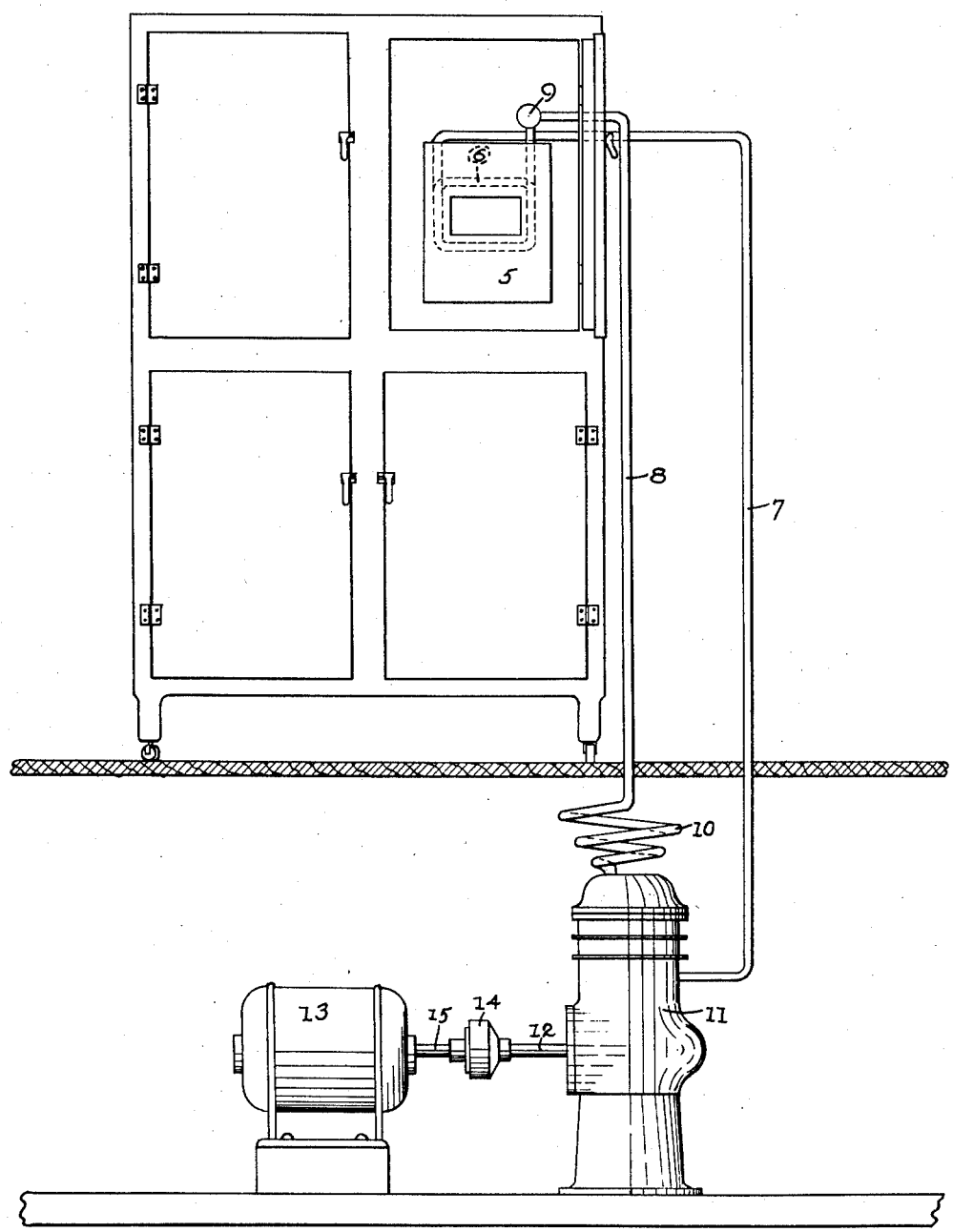
Figure 1 is a general view of this illustrative embodiment of my invention.
Figure 2:
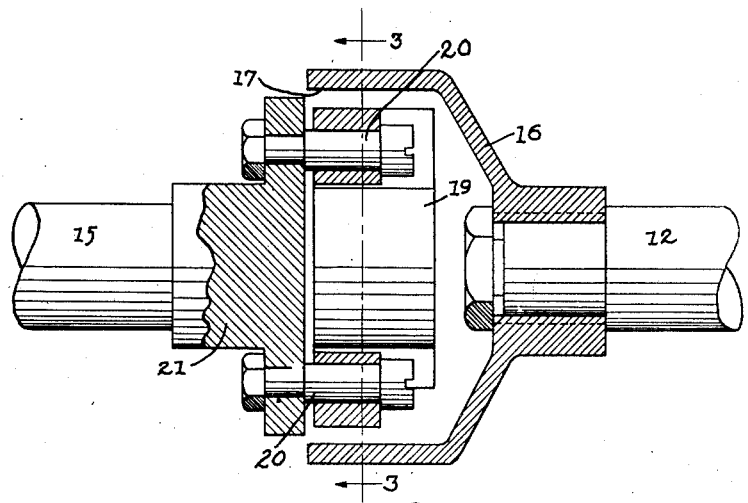
Figure 2 is a detail longitudinal section through a portion of the drive shown in Figure 1.
Figure 3:
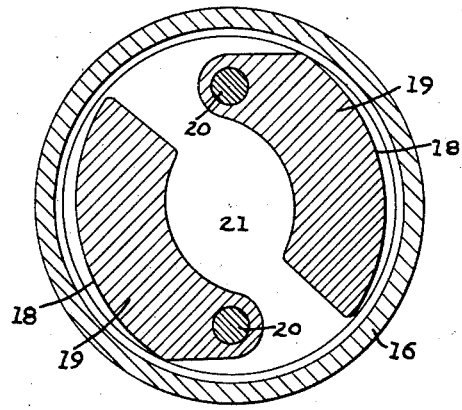
Figure 4:
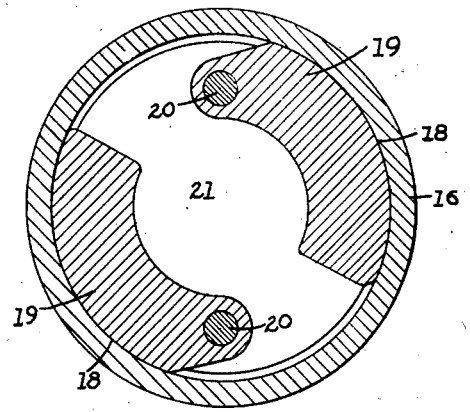
Figure 4 is a view similar to Figure 3 showing the clutch engaged.

The device herein shown comprises a brine tank 5 containing a suitable expansion coil 6 having its outlet connected by means of a duct 7 to the inlet of a compressor 11 and its inlet connected by means of a duct 8 and through an expansion valve 9 to the outlet end of a condenser 10 having its inlet end connected to the outlet end of the compressor 11, and the compressor 11 provided with an operating shaft 12 driven from a motor 13 through a clutch 14 interposed between the motor shaft 15 and the compressor shaft 12 and arranged to connect the motor 13 to the compressor 11 only after the motor has reached a predetermined speed and to an extent predetermined for each speed of the motor, to thereafter disconnect the motor 13 from the compressor 11 whenever the speed falls below this determined speed, and to permit the operation of the motor independently of the compressor when the torque necessary for operation of the compressor exceeds the predetermined value critical for the speed at which the unit is then operating.

The particular form of clutch herein shown comprises an annular member 16 secured to the compressor shaft 12 and provided with an inner face 17 arranged to be engaged by the outer faces 18 of a pair of centrifugal clutch members 19 which are pivotally carried on studs 20 secured to and rotating with a collar 21 carried by the motor shaft 15 and so arranged that rotation of the motor shaft 15 will correspondingly rotate the centrifugal members 19 to cause them to move outwardly and bring their engaging surfaces 18 into contact with the inner face 17 of the annular member 16 with a force which increases continuously with increase in the speed of the motor until at the motor speed at which the motor torque is sufficient to normally operate the compressor the friction between the outer faces 18 of the centrifugal members 19 and the inner face 17 of the annular member 16 is sufficient to transmit the motion of the motor 13 to the compressor 11 to operate the compressor 11. Thereafter the clutch 14 will continue to transmit that motion and the compressor 11 continue to be operated until such time as the torque required to operate the compressor 11 is greater than the torque transmissible by the clutch 14 at the speed at which the motor 13 is then operating. Accordingly, the clutch 14 is effective to continually operate the compressor 11 under normal conditions but discontinues this operating should the speed of the motor fall off for any reason whatever or should the torque required to operate the compressor increase above the predetermined value safe for the motor at the existing speed of operation.

From the above disclosure it will be obvious to those skilled in the art that I have provided a refrigerating system having a superior compressor drive. It will also be obvious to those skilled in the art that the particular construction herein shown may be variously changed and modified without departing from the spirit of my invention or sacrificing the advantages thereof. It will therefore be understood that this disclosure is illustrative only and that my invention is not limited thereto.

I claim:

A domestic refrigerating system of the compressor-condenser-expander type comprising a compressor adapted to compress the refrigerant, a motor of low starting torque adapted to operate the compressor after said motor has reached normal speed and while said compressor offers normal resistance but ineffective to operate said compressor before said motor reaches normal speed or when said compressor offers abnormal resistance, and a driving device connecting said motor and said compressor by a frictional engagement at all times responsive only to the speed of said motor, gradually increasingly connecting said motor to said compressor as said motor reaches speed, and at the maximum normal speed of said motor affording a connection between said motor and said compressor effective to transmit but slightly greater torque than the maximum torque required to drive said compressor under normal conditions.

In testimony whereof I hereunto affix my signature.

WILLIAM D. MERCER.